(12) United States Patent
Suzuki

(10) Patent No.: US 11,691,330 B2
(45) Date of Patent: Jul. 4, 2023

(54) FORMING APPARATUS, SHAPED OBJECT MANUFACTURING METHOD, AND CONVEYANCE APPARATUS

(71) Applicant: CASIO COMPUTER CO., LTD., Tokyo (JP)

(72) Inventor: Masakazu Suzuki, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 58 days.

(21) Appl. No.: 17/153,931

(22) Filed: Jan. 21, 2021

(65) Prior Publication Data
US 2021/0291429 A1    Sep. 23, 2021

(30) Foreign Application Priority Data

Mar. 19, 2020   (JP) ................................ 2020-048587
Mar. 19, 2020   (JP) ................................ 2020-048588

(51) Int. Cl.
*B29C 61/04*     (2006.01)
*B29C 35/08*     (2006.01)
*B29C 31/04*     (2006.01)

(52) U.S. Cl.
CPC .............. *B29C 61/04* (2013.01); *B29C 31/04* (2013.01); *B29C 35/08* (2013.01)

(58) Field of Classification Search
CPC ....... B29C 61/04; B29C 31/04; B29C 35/085; B29C 2035/0822; B29C 64/393; B41M 3/06
See application file for complete search history.

(56) References Cited

U.S. PATENT DOCUMENTS

| 9,975,361 | B2 | 5/2018 | Okamura | |
| 2018/0104968 | A1* | 4/2018 | Okamura | B41J 3/38 |
| 2018/0169932 | A1* | 6/2018 | Saito | B41M 3/06 |

FOREIGN PATENT DOCUMENTS

| JP | S64028660 A | 1/1989 |
| JP | 2000194256 A | 7/2000 |
| JP | 2013178353 A | 9/2013 |
| JP | 2018030327 A | 3/2018 |
| JP | 2018062160 A | 4/2018 |
| JP | 2018099851 A | 6/2018 |
| JP | 202097191 A * | 6/2020 |
| JP | 2020097191 A | 6/2020 |

OTHER PUBLICATIONS

Japanese Office Action (and English language translation thereof) dated Apr. 19, 2022, issued in Japanese Application No. 2020-048588.

* cited by examiner

*Primary Examiner* — Alison L Hindenlang
*Assistant Examiner* — Debjani Roy
(74) *Attorney, Agent, or Firm* — Holtz, Holtz & Volek PC

(57) ABSTRACT

A forming apparatus is equipped with (i) a conveyance unit configured to convey a formation sheet, that expands due to irradiation with electromagnetic waves, along a conveyance path in a state in which tension for causing bending in accordance with a conveyance path that is convexly bent is applied, and (ii) an irradiation unit configured to irradiate with the electromagnetic waves the formation sheet during conveyance by the conveyance unit in the state in which the tension is applied.

12 Claims, 10 Drawing Sheets

FORMING APPARATUS, SHAPED OBJECT MANUFACTURING METHOD, AND CONVEYANCE APPARATUS

CROSS-REFERENCE TO RELATED APPLICATION

This application claims the benefit of: Japanese Patent Application No. 2020-048587, filed on Mar. 19, 2020, and Japanese Patent Application No. 2020-048588, filed on Mar. 19, 2020, of which the entirety of the disclosures is incorporated by reference herein.

FIELD

This application relates generally to a forming apparatus, a shaped object manufacturing method, and a conveyance apparatus.

BACKGROUND

Techniques are known that form a three-dimensional object, that is, a shaped object, by irradiating with light a medium, that is, a thermally expansive sheet, for forming an image using a material having light absorbance and equipped with a thermally expansive layer including a thermally expandable material that expands due to heat (for example, Unexamined Japanese Patent Application Kokai Publication No. 2013-178353).

SUMMARY

A forming apparatus according to a first aspect of the present disclosure includes:
a conveyance unit configured to convey along a conveyance path a formation sheet that expands due to irradiation with electromagnetic waves, in a state in which tension is applied to the formation sheet to warp the formation sheet in accordance with the conveyance path that is convexly bent; and
an irradiation unit configured to irradiate with the electromagnetic waves the formation sheet during conveyance by the conveyance unit of the formation sheet in the state in which the tension is applied.

A shaped object manufacturing method according to a second aspect of the present disclosure includes:
a conveyance step of conveying, along a convexly bent conveyance path, a formation sheet that expands due to irradiation with electromagnetic waves;
an application step of applying to the formation sheet during the conveyance tension to cause warping of the formation sheet in accordance with the conveyance path; and
an irradiation step of irradiating with the electromagnetic waves the formation sheet in the state in which the tension is applied.

A conveyance apparatus according to a third aspect of the present disclosure includes:
an irradiation unit configured to irradiate with electromagnetic waves; and
a conveyance unit configured to, in a region of irradiation with the electromagnetic waves, convey along a conveyance path a formation sheet that expands due to irradiation with electromagnetic waves, in a state in which tension is applied to the formation sheet to warp the formation sheet in accordance with the conveyance path that is convexly bent.

BRIEF DESCRIPTION OF THE DRAWINGS

A more complete understanding of this application can be obtained when the following detailed description is considered in conjunction with the following drawings, in which.

DETAILED DESCRIPTION

Figure 1:
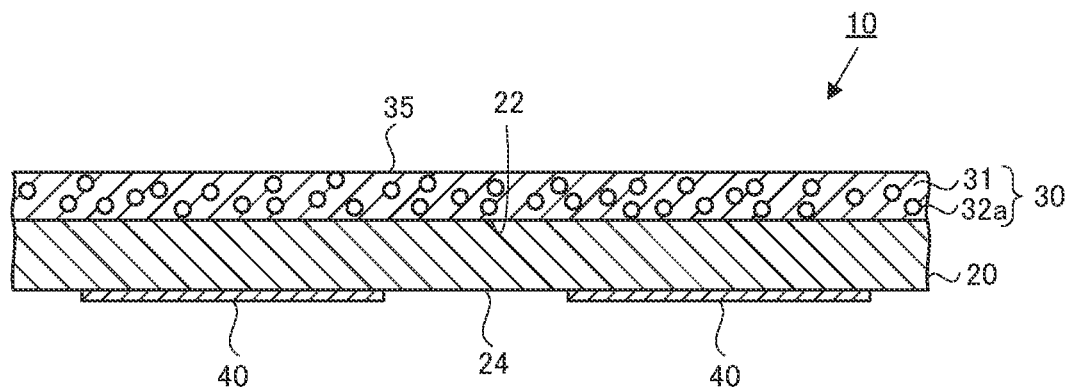
FIG. 1 is a schematic drawing illustrating a cross section of a formation sheet according to an embodiment.

A forming apparatus according to an embodiment of the present disclosure is described below with reference to drawings.

A forming apparatus 100 of the present embodiment manufactures a shaped object 50 from a formation sheet 10. The shaped object 50 is used as a decorative paper, a wallpaper, or the like. In the present disclosure, the term "shaped object" indicates a sheet having unevennesses shaped (formed) on a prescribed surface; and the unevennesses include geometric shapes, characters, patterns, or decorations, for example. Here, the term "decoration" refers to an object that appeals to the aesthetic sense through visual and/or tactile sensation. The term "to shape (or to form)" refers to creating an object having a shape and also encompasses the concepts of adding decorations and generating decorations. Moreover, although the shaped object 50 according to the present embodiment is a three-dimensional object having unevennesses on a prescribed surface, to distinguish this three-dimensional object from a three-dimensional object fabricated by a so-called 3D printer, the shaped object 50 of the embodiment is also called a 2.5-dimensional (2.5D) object or a pseudo-three-dimensional (pseudo-3D) object. The technology for manufacture of the shaped object 50 of the present embodiment is also termed 2.5D printing technology or pseudo-3D printing technology.

Formation Sheet

The formation sheet 10 is firstly described with reference to FIG. 1. The formation sheet 10 expands due to irradiation with the prescribed electromagnetic waves, such as infrared light. Expansion of the formation sheet 10 causes formation of the shaped object 50. The formation sheet 10 is equipped with (i) a base 20, (ii) a thermally expansive layer 30 stacked on a first main surface 22 of the base 20, and (iii) a thermal conversion layer 40 stacked on a second main surface 24 of the base 20. The thermal conversion layer 40 is stacked on the second main surface 24 is a pattern corresponding to unevennesses 52 of the below-described shaped object 50. In the present embodiment, the thermally expansive layer 30 is stacked on the entire first main surface 22.

The base 20 of the formation sheet 10 has the first main surface 22, and has the second main surface 24 opposite to the first main surface 22. The base 20 supports the thermally expansive layer 30. The base 20 is formed with a sheet-like shape, for example. Examples of materials included in the base 20 are thermoplastic resins, such as polyolefin resins (for example, polyethylene (PE) and polypropylene (PP)) and polyester resins (for example, polyethylene terephthalate (PET) and polybutylene terephthalate (PBT)). The type of the material included in the base 20 and the thickness of the base 20 are selected according to the application of the shaped object 50.

The thermally expansive layer 30 of the formation sheet 10 is stacked on the first main surface 22 of the base 20. The thermally expansive layer 30 includes a binder 31 and a thermally expandable material (that is, an unexpanded thermally expandable material) 32a dispersed in the binder 31. The binder 31 is any thermoplastic resin, such as a vinyl acetate polymer or an acrylic polymer. The thermally expandable material 32a is expandable, by being heated to a temperature of at least a predetermined temperature, to a size depending on the amount of applied heat, specifically, depending on a heating temperature or heating period, for example. The thermally expandable material 32a is expanded when heated to a temperature of at least 80° C. to 120° C., for example. The thermally expandable material 32a, for example, is a thermally expandable microcapsule.

The thermally expandable microcapsule is a microcapsule formed by enclosing a foaming agent including a low boiling point substance, such as propane or butane, in a thermoplastic resin shell. The shell of the thermally expandable microcapsule is formed from a thermoplastic resin, such as polystyrene, polyvinyl chloride, polyvinylidene chloride, polyvinyl acetate, polyacrylic acid ester, polyacrylonitrile, polybutadiene, and copolymers thereof. Heating of the thermally expandable microcapsule to a temperature of at least the predetermined temperature, that is, an expansion initiation temperature, causes softening of the shell and evaporation of the foaming agent. The evaporation of the foaming agent increases pressure and causes the balloon-like expansion of the shell. The thermally expandable microcapsule expands to a particle size approximately five times that of the unexpanded microcapsule. An average particle size of the unexpanded thermally expandable microcapsules is 5 to 50 μm, for example.

The thermally expansive layer 30 of the formation sheet 10 expands due to expansion of the thermally expandable material 32a, and forms the unevennesses 52 of a surface 35 opposite to the base 20.

The thermal conversion layer 40 of the formation sheet 10 is provided for forming the unevennesses 52 of the shaped object 50. The thermal conversion layer 40 is stacked on the second main surface 24 of the base 20 in a pattern corresponding to the unevennesses 52.

The thermal conversion layer 40 converts prescribed electromagnetic waves, that are used for irradiation, into heat, and releases the converted heat. Due to such operation, the thermally expansive layer 30 of the formation sheet 10, that is, the unexpanded thermally expandable material 32a, is heated to the prescribed temperature. The temperature to which the unexpanded thermally expandable material 32a is heated can be controlled by (i) contrast of the thermal conversion layer 40 including a below-described thermal conversion material, and by (ii) an amount of energy of the electromagnetic waves emitted to the thermal conversion layer 40 per unit area and unit time. The thermal conversion layer 40 converts the prescribed electromagnetic waves into heat at a rate higher than the other portions of the formation sheet 10, leading to selective heating of regions (of the thermally expansive layer 30) adjacent to the thermal conversion layer 40. Hereinafter, the prescribed electromagnetic waves may be referred to simply as "electromagnetic waves".

The thermal conversion layer 40 includes a thermal conversion material for converting the absorbed electromagnetic waves into heat. Examples of the thermal conversion material include carbon blacks, metal hexaboride compounds, and tungsten oxide compounds. The carbon blacks can absorb visible light, infrared light, or the like for conversion into heat, for example. Moreover, the metal hexaboride compounds and the tungsten oxide compounds absorb near-infrared light and convert the light into heat. Among the metal hexaboride compounds and the tungsten oxide compounds, lanthanum hexaboride ($LaB_6$) and cesium tungstate are preferred due to high absorbance in the near-infrared region and high transmittance in the visible light region. Due to the thermal conversion material included in the thermal conversion layer 40 being absorbed in the base 20, the thermally expansive layer 30, or the like, the thermal conversion layer 40 sometimes does not have a layer structure with a distinct boundary. In order to facilitate understanding in the present disclosure, layers are indicated that have a distinct boundary for the thermal conversion layer 40.

Shaped Object

Figure 2:
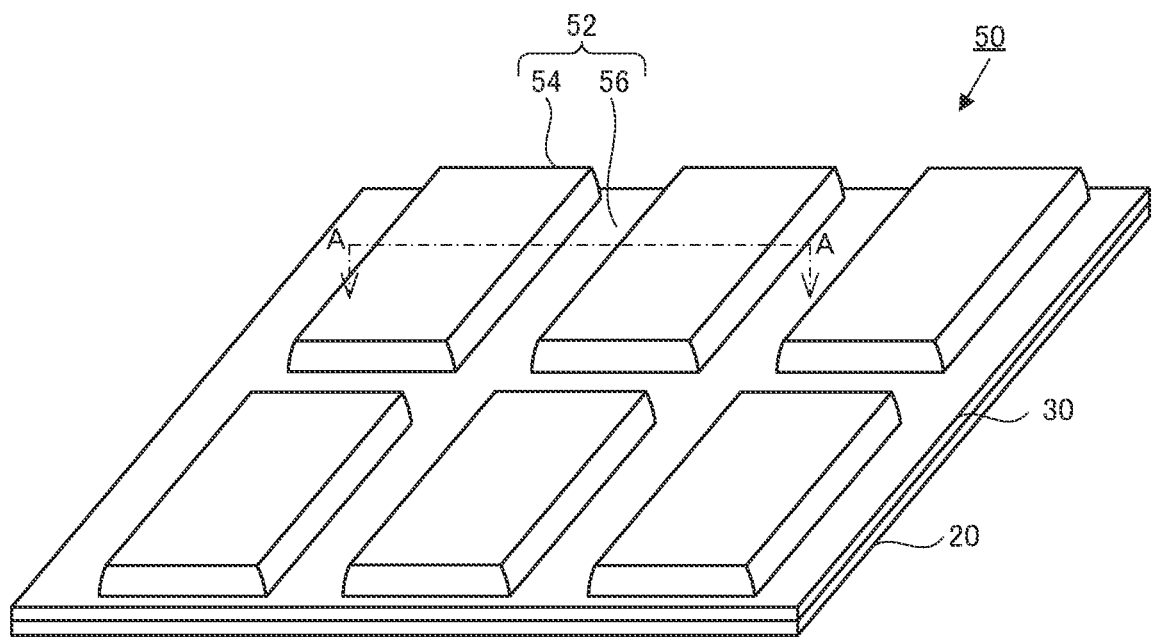
FIG. 2 is a perspective view illustrating a shaped object according to the embodiment.

Next, the shaped object 50 is described with reference to FIGS. 2 and 3. The shaped object 50 is formed from the formation sheet 10. The shaped object 50, as illustrated in FIG. 2, is a sheet-like shaped object that has unevennesses 52 on the surface.

Figure 3:
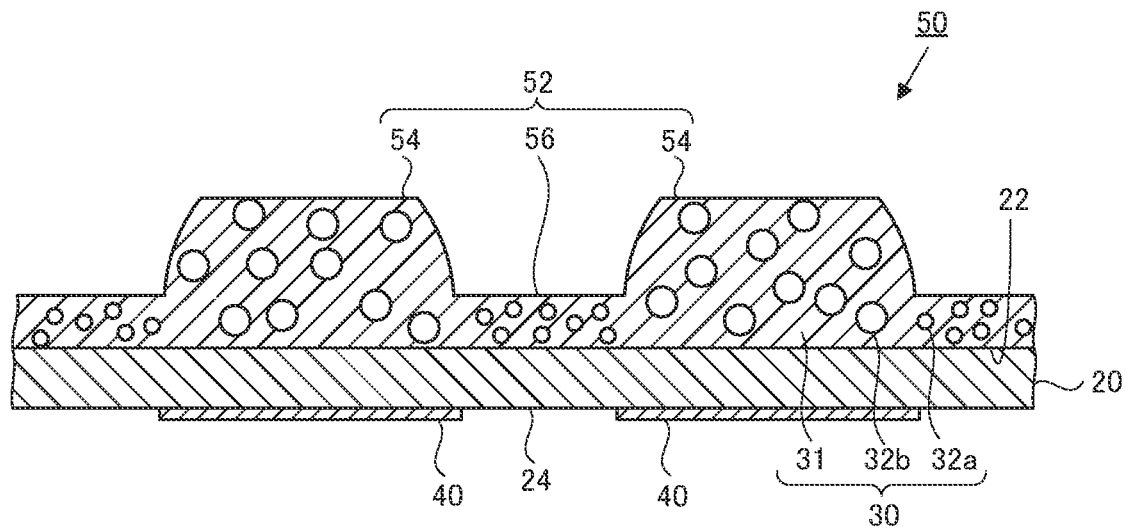
FIG. 3 is a cross-sectional drawing, taken at line A-A and viewed in the direction indicated by arrows, of the shaped object illustrated in FIG. 2.

The shaped object 50, as illustrated in FIG. 3, is equipped with a base 20, a thermally expansive layer 30 that is stacked on the first main surface 22 of the base 20 and that has unevennesses 52 on a side opposite to the base 20, and the thermal conversion layer 40 that is stacked on the second main surface 24 of the base 20. The configuration of the base 20 and the thermal conversion layer 40 of the shaped object 50 is similar to the base 20 and the thermal conversion layer 40 of the formation sheet 10, and thus the thermally expansive layer 30 of the shaped object 50 is described.

As illustrated in FIG. 3, the thermally expansive layer 30 of the shaped object 50 includes the binder 31, the thermally expandable material (unexpanded thermally expandable material) 32a, and the expanded thermally expandable material 32b. The binder 31 of the thermally expansive layer 30 of the shaped object 50 is similar to the binder 31 of the thermally expansive layer 30 of the formation sheet 10. Moreover, the thermally expandable material 32a of the thermally expansive layer 30 of the shaped object 50 is similar to the thermally expandable material 32a of the thermally expansive layer 30 of the formation sheet 10. The expanded thermally expandable material 32b is the thermally expandable material after the thermally expandable material 32a is expanded by heating to at least the prescribed temperature. The unevennesses 52 of the thermally expansive layer 30 include protrusions 54 including the expanded thermally expandable material 32b and recesses 56 including the unexpanded thermally expandable material 32a.

Forming Apparatus

Figure 4:
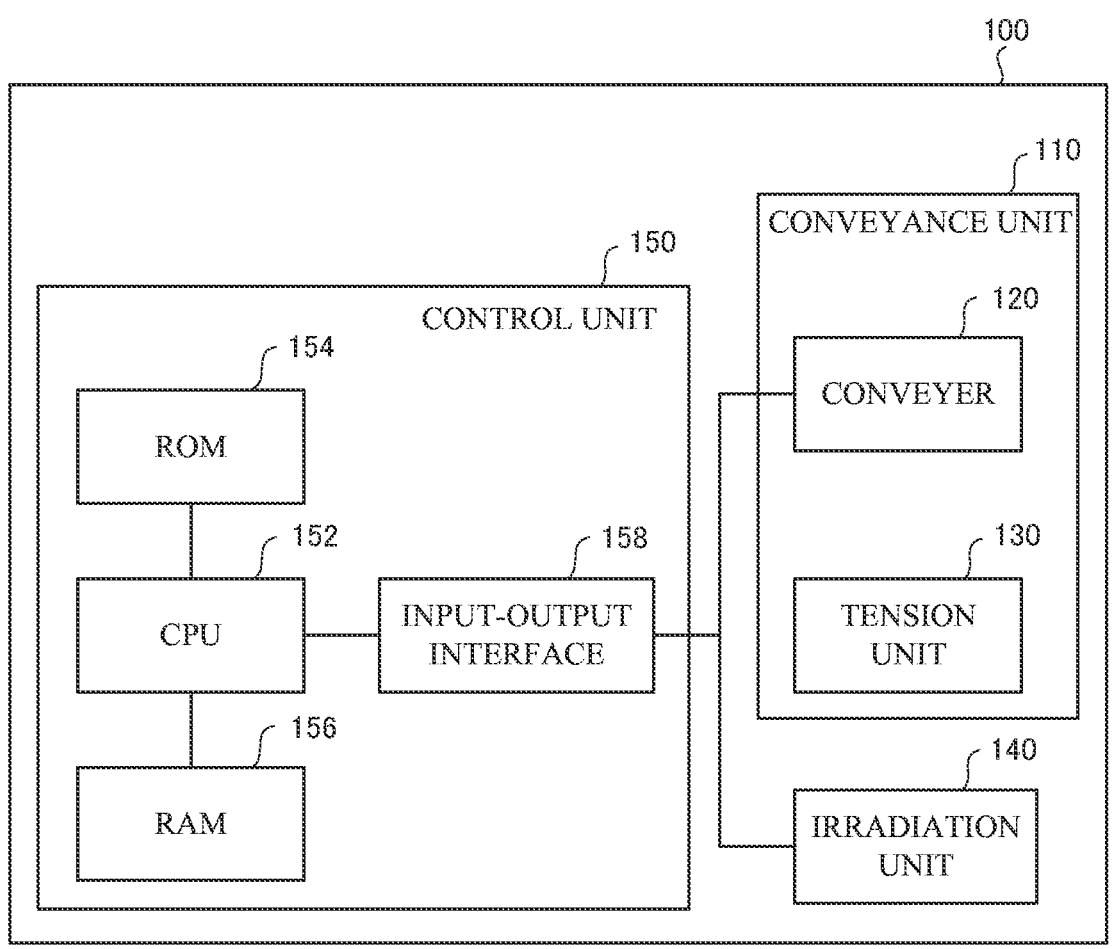
FIG. 4 illustrates configuration of a forming apparatus according to the embodiment.
Figure 5:
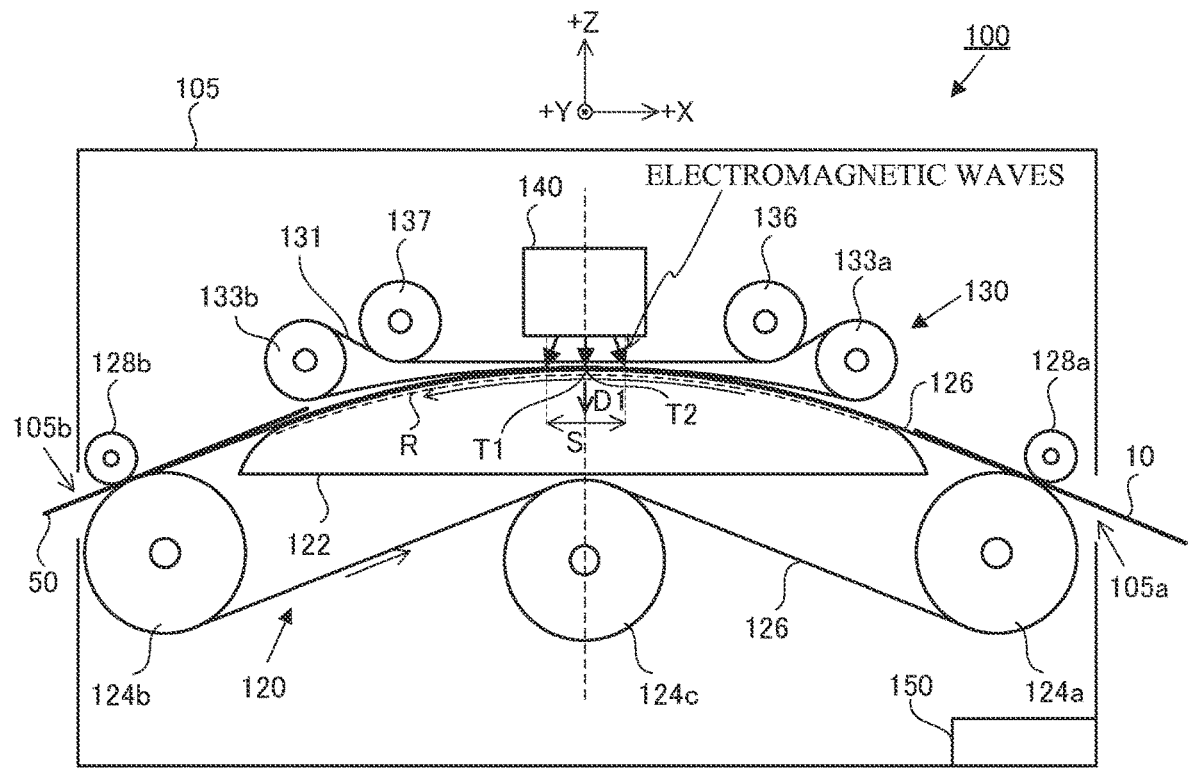
FIG. 5 is a schematic drawing illustrating the forming apparatus according to the embodiment.

The forming apparatus 100 is described with reference to FIGS. 4-9. The forming apparatus 100 manufactures the shaped object 50 from the formation sheet 10 by irradiating the formation sheet 10 with the prescribed electromagnetic waves to cause expansion of the formation sheet 10. As illustrated in FIG. 4, the forming apparatus 100 is equipped with a conveyance unit 110 that conveys the formation sheet 10 in a state in which tension is applied to the formation sheet 10, an irradiation unit 140 that irradiates the formation sheet 10 with the prescribed electromagnetic waves to cause expansion of the formation sheet 10, and a control unit 150 that controls various components. The conveyance unit 110 is equipped with a conveyer 120 that conveys the formation sheet 10 and a tension unit 130 that applies the tension to the formation sheet 10. As illustrated in FIG. 5, the conveyer 120, the tension unit 130, the irradiation unit 140, and the control unit 150 are arranged within a case 105. The case 105 has a feed port 105a for feeding of the formation sheet 10 and an output port 105b for discharge of the manufactured shaped object 50. To facilitate understanding in the present disclosure, a longitudinal rightward direction (rightward in the surface of the page) of the forming apparatus 100 in FIG. 5 is described as a +X direction, an upward direction (upward in the surface of the page) is described as a +Z direction, and a direction perpendicular to the +X direction and the +Z direction (forward out of the surface of the page) is described as a +Y direction. In the present disclosure, the −Z direction is vertically downward. Moreover, the −Z side is sometimes described as downward, and the +Z side is sometimes described as upward.

Conveyance Unit

The conveyance unit 110 of the forming apparatus 100 conveys the formation sheet 10 fed from the feed port 105a of the case 105 along a conveyance path R in a state in which the tension is applied to the formation sheet 10 that causes warping of the formation sheet 10 in accordance with convex bending of the conveyance path R. In the present embodiment, the convexly bent conveyance path R bends so as to project in the +Z direction. Moreover, an apex T1 of the convexly bent conveyance path R is positioned at a −Z side, that is, downward, of the irradiation unit 140 for irradiation with the electromagnetic waves in the −Z direction. The conveyance unit 110 conveys the formation sheet 10 along the conveyance path R from the +X side in the −X direction. The conveyance unit 110 is equipped with the conveyer 120 that conveys the formation sheet 10 along the conveyance path R and the tension unit 130 that applies the tension to the formation sheet 10 to cause warping in accordance with the conveyance path R.

Conveyer

The conveyer 120 of the conveyance unit 110 conveys the formation sheet 10 fed from the feed port 105a of the case 105 in the −X direction along the convexly bent conveyance path R. Specifically, the conveyer 120 conveys the formation sheet 10, toward a region S of irradiation with the electromagnetic waves, from a second direction D2 forming an obtuse angle θ relative to a direction (+Z direction) opposite to a prescribed first direction D1 (−Z direction) of irradiation of the electromagnetic waves, and to a direction opposite to the prescribed first direction D1 of irradiation with the electromagnetic waves. Furthermore, the conveyer 120 conveys the formation sheet 10, from the region S of irradiation with the electromagnetic waves, to the prescribed first direction D1 of irradiation by the electromagnetic waves, and toward a third direction D3 forming an acute angle φ with the prescribed first direction D1 (−Z direction) of irradiation with the electromagnetic waves. Moreover, the conveyer 120 conveys the manufactured shaped object 50 and outputs the shaped object 50 from the output port 105b of the case 105. The conveyer 120 is equipped with a guide unit 122, a driven roller 124a, a drive roller 124b, a tension roller 124c, and a conveyance belt 126. The conveyer 120 is further equipped with a feed roller 128a and a output roller 128b.

Figure 6:
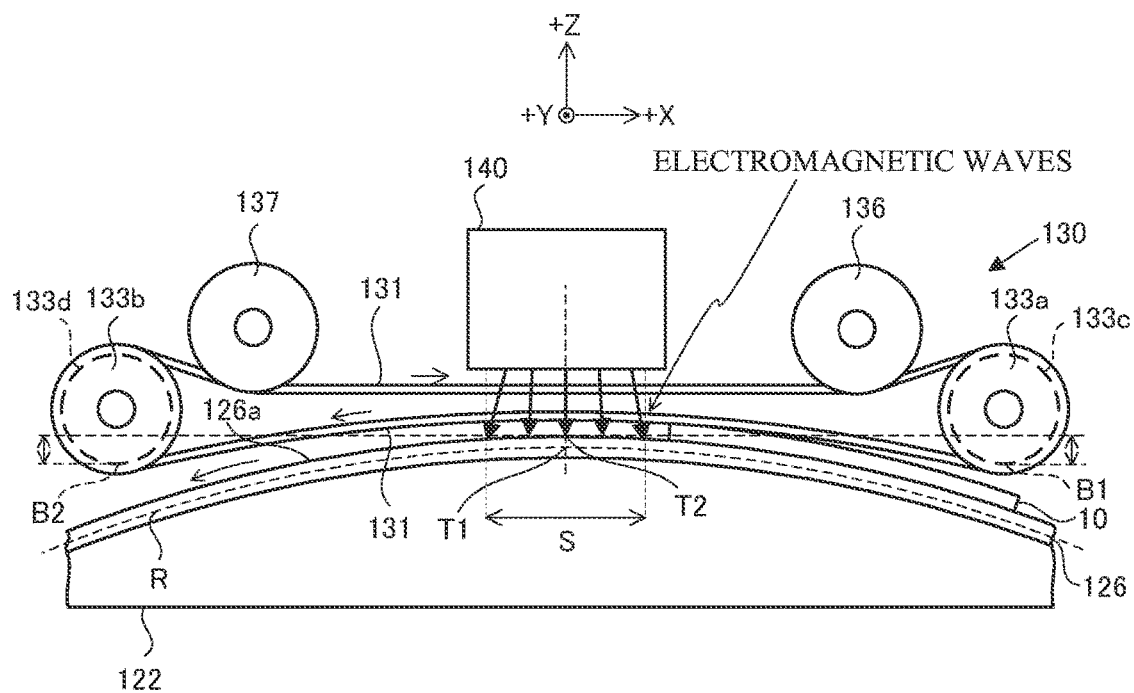
FIG. 6 is a side view of a conveyance belt, a tension unit, and a formation sheet according to the embodiment.

As illustrated in FIGS. 5 and 6, the guide unit 122 of the conveyer 120 supports a forward-path portion of the conveyance belt 126 from the −Z direction in a state such that the forward-path portion bends along the convexly bent conveyance path R.

As illustrated in FIG. 5, the conveyance belt 126 is wound on the driven roller 124a of the conveyer 120. The driven roller 124a is arranged at the feed port 105a side, that is, the +X side, of the case 105. A rotation shaft of the driven roller 124a is arranged in the direction (Y direction) perpendicular to the conveyance direction (−X direction) of the formation sheet 10 and the protrusion direction (+Z direction) of the conveyance path R. The driven roller 124a is rotatably supported by a side plate of the case 105.

The conveyance belt 126 is wound on the drive roller 124b of the conveyer 120. The drive roller 124b is arranged to the output port 105b side (−X side) of the case 105. The rotation shaft of the drive roller 124b is arranged in the Y direction similarly to the rotation shaft of the driven roller 124a. The drive roller 124b is rotatably supported by the side plate of the case 105. The conveyance belt 126 runs due to counterclockwise rotation, as viewed in the −Y direction, of the drive roller 124b due to rotation by a non-illustrated motor.

The tension roller 124c of the conveyer 120 applies the tension to the conveyance belt 126 by pressing from the −Z direction the return-path portion of the conveyance belt 126. The rotation shaft of the tension roller 124c is arranged in the Y direction similarly to the rotation shaft of the driven roller 124a. The tension roller 124c is rotatably supported by the side plate of the case 105.

The conveyance belt 126 of the conveyer 120 is an endless belt. The conveyance belt 126 conveys the formation sheet 10 and the manufactured shaped object 50. The conveyance belt 126 wound on the driven roller 124a and the drive roller 124b. The forward-path portion of the conveyance belt 126 bends convexly along the conveyance path R that bends convexly due to support by the guide unit 122. An apex T2 of the forward-path portion of the convexly bent conveyance belt 126 is positioned downward (−Z side) from the irradiation unit 140. The conveyance belt 126 runs due to rotation of the drive roller 124b. The forward-path portion of the conveyance belt 126 runs in the −X direction along the conveyance path R, and the return-path portion of the conveyance belt 126 runs in the +X direction. As illustrated in FIG. 5, the formation sheet 10 is carried, in the −X direction, by the conveyance belt 126 from the feed port 105a of the case 105. From the standpoint of highly efficient heating of the thermally expansive layer 30, distance between the thermal conversion layer 40 and the irradiation unit 140 is preferably short, and the formation sheet 10 is preferably conveyed in a state in which the thermal conversion layer 40 faces the irradiation unit 140 side. That is, the formation sheet 10 is preferably carried by the conveyance belt 126 with the thermally expansive layer 30 facing a conveyance surface 126a of the conveyance belt 126.

The feed roller 128a of the conveyer 120, similarly to the driven roller 124a, is rotatably supported by the side plate of the case 105. The feed roller 128a and the conveyance belt 126, as illustrated in FIG. 5, sandwich the formation sheet 10 inserted from the feed port 105a of the case 105, and feed the formation sheet 10 into the case 105.

The output roller 128b of the conveyer 120, similarly to the drive roller 124b, is rotatably supported by the side plate of the case 105. The output roller 128b and the conveyance belt 126 sandwich the manufactured shaped object 50, and discharge the shaped object 50 from the output port 105b of the case 105.

Figure 7:
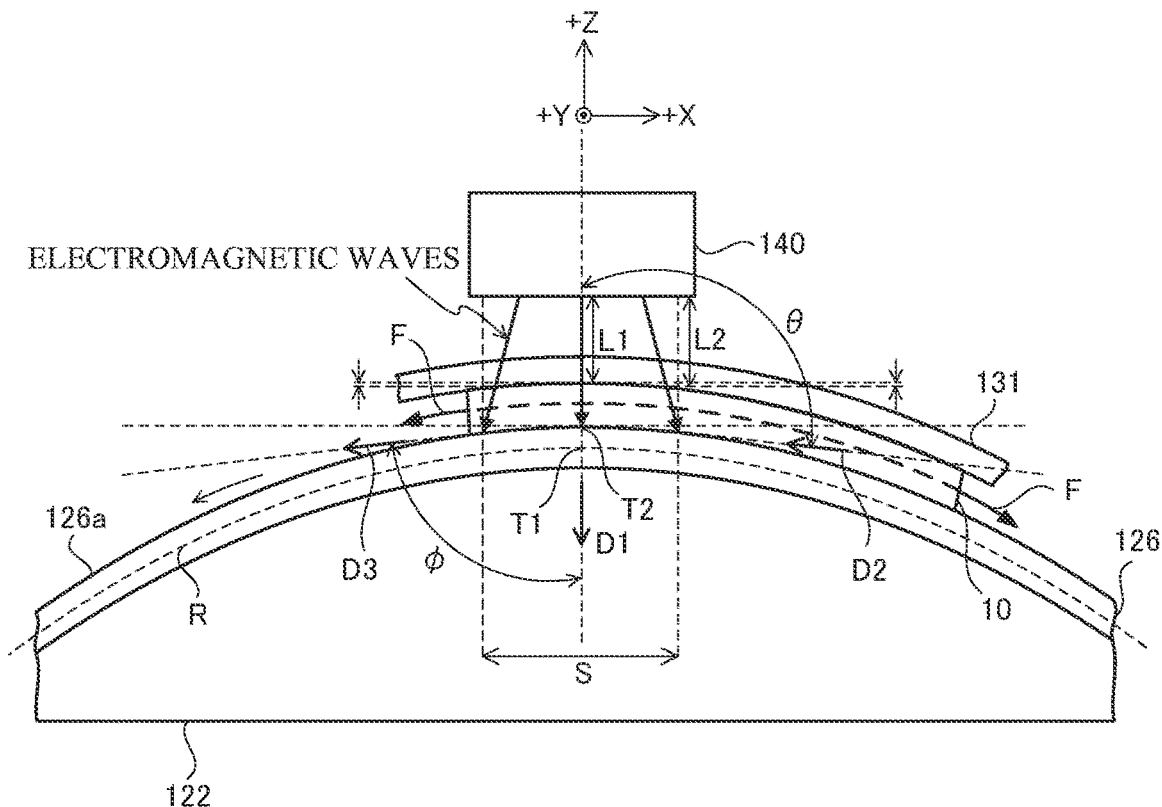
FIG. 7 is a schematic drawing illustrating a region for irradiating with electromagnetic waves and the conveyed formation sheet according to the embodiment.

In the present embodiment, the formation sheet 10 is conveyed along the conveyance path R in a state in which the tension for causing warping in accordance with the convexly bent conveyance path R is applied to the formation sheet 10. Specifically, the conveyer 120 conveys the formation sheet 10, toward the region S where the irradiation unit 140 performs irradiation with the electromagnetic waves, and from the second direction D2 forming an obtuse angle θ with the direction (+Z direction) opposite to the prescribed first direction D1 (−Z direction) of the irradiation with the electromagnetic waves. Then the conveyer 120 conveys the formation sheet 10, toward the third direction D3 forming an acute angle φ with the prescribed first direction D1 (−Z direction) of irradiation with the electromagnetic waves, and from the region S of irradiation with the electromagnetic waves. Due to such operation, as illustrated in FIG. 7, a distance L2 between the irradiation unit 140 and the formation sheet 10 at a conveyance-direction peripheral portion of the region S of irradiation with the electromagnetic waves is longer than a distance L1 between the irradiation unit 140 and the formation sheet 10 at a central portion of the region S of irradiation with the electromagnetic waves. The distance L2 between the irradiation unit 140 and the formation sheet 10 is long at the conveyance-direction peripheral portion of the region S of irradiation with the electromagnetic waves, and thus the energy amount of the electromagnetic waves used for irradiation of the formation sheet 10 is small, and the heating temperature of the unexpanded thermally expandable material 32a is low. That is to say, unintentional expansion can be prevented for the thermally expandable material 32a outside of the positions where the protrusions 54 of the shaped object 50 are formed, that is, outside of the portions corresponding to the thermal conversion layer 40. Therefore, the forming apparatus 100 suppresses the occurrence of unintentional heating at the peripheral portion of the region S of irradiation with the electromagnetic waves, thereby enabling suppression of the occurrence of rounding at edge portions of the protrusions 54 of the shaped object 50. Due to suppression of the occurrence of rounding at the edge portions of the protrusions 54 of the shaped object 50, the forming apparatus 100 can manufacture the shaped object 50 that has high definition unevennesses 52.

Tension Unit

Figure 8:
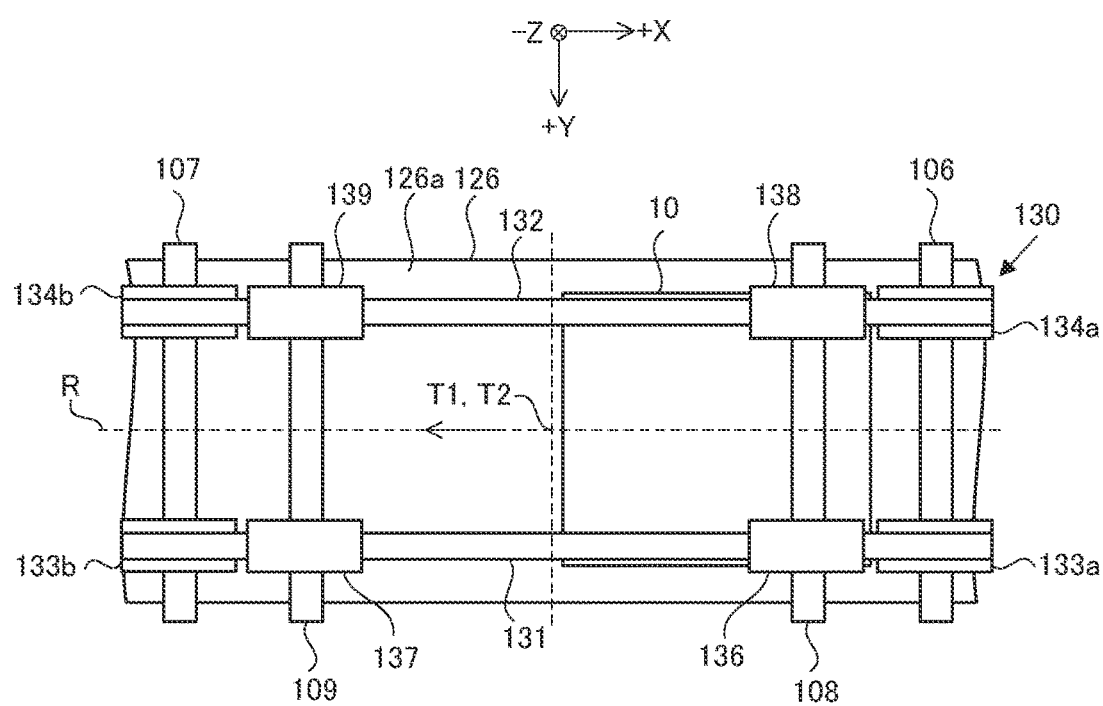
FIG. 8 is a top view illustrating the conveyance belt, the tension unit, and the formation sheet according to the embodiment.

The tension unit 130 of the conveyance unit 110 applies the tension to the formation sheet 10 to cause warping in accordance with the convexly bent conveyance path R. The tension unit 130, as illustrated in FIG. 8, is equipped with a pair of pressing belts 131 and 132. The pressing belts 131 and 132 press against the conveyance belt 126 at the lateral direction edge portions (+Y direction edge portion and −Y direction edge portion, respectively) of the conveyance belt 126 of the formation sheet 10, thereby applying the tension F that causes warping of the formation sheet 10 in accordance with the conveyance path R. The tension unit 130 is further equipped with (i) a first pulley 133a and a second pulley 133b upon which is wound the pressing belt 131, a third pulley 134a and a fourth pulley 134b upon which is wound the pressing belt 132, and four bending pulleys 136-139.

Firstly, the pressing belt 131, the first pulley 133a, and the second pulley 133b are described. The pressing belt 131 presses the +Y direction edge portion of the formation sheet 10 against the conveyance belt 126 and applies the tension F that causes warping to the +Y side edge portion of the formation sheet 10 in accordance with the conveyance path R. The pressing belt 131 is wound on the first pulley 133a and the second pulley 133b.

As illustrated in FIGS. 6 and 8, the first pulley 133a is disposed above (+Z side) the Y side edge portion of the conveyance surface 126a of the conveyance belt 126, at an upstream side (+X side) of the conveyance path R relative to the apex T2 of the forward-path portion of the convexly bent conveyance belt 126. Furthermore, in the present embodiment as illustrated in FIG. 6, a bottom edge B1 of an outer periphery 133c of the first pulley 133a upon which is wound the pressing belt 131 is located at a position (−Z side) lower than the apex T2 of the forward-path portion of the conveyance belt 126. The first pulley 133a rotates around an axel 106 as a rotation shaft fixed to the side plate of the case 105. Further, the apex T2 of the forward-path portion of the conveyance belt 126 is also referred to below as the apex T2 of the conveyance belt 126.

As illustrated in FIGS. 6 and 8, the second pulley 133b is disposed above (+Z side) the Y side edge portion of the conveyance surface 126a of the conveyance belt 126, at a downstream side (−X side) of the conveyance path R relative to the apex T2 of the forward-path portion of the conveyance belt 126. As illustrated in FIG. 6, a bottom edge B2 of an outer periphery 133d of the second pulley 133b upon which is wound the pressing belt 131 is located at a position (−Z side) lower than the apex T2 of the conveyance belt 126. The second pulley 133b rotates around an axel 107 as a rotation shaft fixed to the side plate of the case 105.

The pressing belt 131 is an endless belt. The pressing belt 131 is wound on the first pulley 133a and the second pulley 133b. In the present embodiment, the first pulley 133a and the second pulley 133b are disposed respectively at the +X side and the −X side to sandwich the apex T2 of the conveyance belt 126. Furthermore, the bottom edge B2 of the outer periphery 133c of the first pulley 133a and the bottom edge B2 of the outer periphery 133d of the second pulley 133b are positioned further to the −Z side than the apex T2 of the conveyance belt 126. Therefore, the forward-path portion of the pressing belt 131 can press the conveyance belt 126 through the +Y side edge portion of the formation sheet 10 being conveyed by the conveyer 120, that is, the conveyance belt 126. The pressing belt 131 compresses the +Y side edge portion of the formation sheet 10 conveyed along the convexly bent conveyance path R, and thus as illustrated in FIG. 7, at the +Y side edge portion of the formation sheet 10, the tension F can be applied for warping the formation sheet 10 in accordance with the conveyance path R.

The forward-path portion of the pressing belt 131 compresses the formation sheet 10 conveyed by the conveyance belt 126, and thus travels in the −X direction in accordance with travel of the conveyance belt 126. Moreover, the return-path portion of the pressing belt 131 travels in the +X direction.

Next, the pressing belt 132, the third pulley 134a, and the fourth pulley 134b are described. The pressing belt 132 presses the −Y direction edge portion of the formation sheet 10 against the conveyance belt 126, thereby applying the tension F that warps the formation sheet 10 to the −Y side edge portion of the formation sheet 10 in accordance with the conveyance path R. The pressing belt 132 is wound on the third pulley 134a and the fourth pulley 134b.

As illustrated in FIG. 8, the third pulley 134a is disposed similarly to the first pulley 133a, with the exception of being positioned above (+Z side) the −Y side edge portion of the conveyance surface 126a of the conveyance belt 126. Moreover, the fourth pulley 134b is disposed similarly to the second pulley 133b, with the exception of being positioned above (+Z side) the −Y side edge portion of the conveyance surface 126a of the conveyance belt 126.

Configuration of the pressing belt 132 is similar to configuration of the pressing belt 131, with the exception of being wound upon the third pulley 134a and the fourth pulley 134b, and pressing against the conveyance belt 126 the −Y side edge portion of the conveyed formation sheet 10. Due to pressing against the conveyance belt 126 the −Y side edge portion of the conveyed formation sheet 10, similarly to the pressing belt 131, the pressing belt 132 can apply to the −Y side edge portion of the formation sheet 10 the tension F that causes warping of the formation sheet 10 in accordance with the conveyance path R.

In the present embodiment, the pair of pressing belts 131 and 132 apply respectively, to the +Y side edge portion and the −Y side edge portion of the formation sheet 10, the tension F for warping the formation sheet 10 in accordance with the conveyance path R. Therefore, the forming apparatus 100 can suppress bowing, bending, or the like of the formation sheet 10, and can irradiate the formation sheet 10 with the electromagnetic waves in a state in which the formation sheet 10 closely conforms to the conveyance belt 126. Furthermore, due to conveyance of the formation sheet 10 while applying the tension F for warping the formation sheet 10 upon the convexly bent conveyance belt 126 in accordance with the conveyance path R, the forming apparatus 100 enables suppression of the occurrence of wrinkling in the formation sheet 10, in comparison to the case of horizontal conveyance of the formation sheet 10.

The two bending pulleys 136 and 137 press against the return-path portion of the pressing belt 131 and thus change the travel direction of the return-path portion of the pressing belt 131. Due to such configuration, the return-path portion of the pressing belt 131 passes below (−Z side) the irradiation unit 140 as illustrated in FIGS. 5 and 6.

The bending pulley 136, as illustrated in FIGS. 6 and 8, is disposed above (+Z side) the +Y side edge portion of the conveyance surface 126a, and between the irradiation unit 140 and the first pulley 133a at an upstream side (+X side) of the conveyance path R relative to the apex T2 of the conveyance belt 126. The bottom edge of the outer periphery of the bending pulley 136 compressing the conveyance belt 126 is located at a position (−Z side) lower than the bottom edge of the irradiation unit 140. The bending pulley 136 rotates using, as a rotation shaft, an axel 108 fixed to the side plate of the case 105.

Moreover, the bending pulley 137 is disposed above (+Z side) the +Y side edge portion of the conveyance surface 126a, and between the irradiation unit 140 and the second pulley 133b at a downstream side (−X side) of the conveyance path R relative to the apex T2 of the conveyance belt 126. The bottom edge of the outer periphery of the bending pulley 137 compressing the conveyance belt 126 is located at a position (−Z side) lower than the bottom edge of the irradiation unit 140. The bending pulley 137 rotates using, as a rotation shaft, an axel 109 fixed to the side plate of the case 105.

The two bending pulleys 138 and 139 press against the return-path portion of the pressing belt 132 and thus change the travel direction of the return-path portion of the pressing belt 132. Due to such configuration, the return-path portion of the pressing belt 132 passes below (−Z side) the irradiation unit 140.

The bending pulley 138 is disposed above (+Z side) the −Y side edge portion of the conveyance surface 126a, and between the irradiation unit 140 and the third pulley 134a at the upstream side (+X side) of the conveyance path R relative to the apex T2 of the conveyance belt 126. Other configuration of the bending pulley 138 is similar to configuration of the bending pulley 136. The bending pulley 139 is disposed above (+Z side) the −Y side edge portion of the conveyance surface 126a, and between the irradiation unit 140 and the fourth pulley 134b at the downstream side (−X side) of the conveyance path R relative to the apex T2 of the conveyance belt 126. Other configuration of the bending pulley 139 is similar to configuration of the bending pulley 137.

Irradiation Unit

The irradiation unit 140 of the forming apparatus 100 irradiates with the prescribed electromagnetic waves the formation sheet 10 (thermal conversion layer 40), causes release of heat by the thermal conversion layer 40, and heats the thermally expansive layer 30 (unexpanded thermally expandable material 32a) to at least the prescribed temperature. In the present embodiment, the thermal conversion layer 40 is stacked on the second main surface 24 of the base 20 in a pattern corresponding to the unevennesses 52 of the shaped object 50. Therefore, the portions of the formation sheet 10 corresponding to the protrusions 54 of the thermally expansive layer 30 are heated to at least the prescribed temperature, and the expanded thermally expandable material 32b is formed. Due to the formation of the expanded thermally expandable material 32b, the thermally expansive layer 30 expands to cause formation of the protrusions 54, that is, the unevennesses 52, in the thermally expansive layer 30, thereby manufacturing the shaped object 50.

In the present embodiment, during passage of the formation sheet 10 through the region S, the irradiation unit 140 irradiates, in the prescribed first direction D1, with the electromagnetic waves for causing expansion of the formation sheet 10. The irradiation unit 140 is disposed at the convex side of the convexly bend conveyance path R and irradiates with the electromagnetic waves the formation sheet 10 that is being conveyed in the state in which the tension F is applied for warping in accordance with the conveyance path R. Specifically, the irradiation unit 140, as illustrated in FIGS. 5 and 6, is disposed above (+Z side) of the apex T2 of the conveyance belt 126. As illustrated in FIG. 7, the irradiation unit 140 irradiates with the electromagnetic waves, from above (+Z side) the apex T1 of the convexly bent conveyance path R, and toward the −Z direction that is the prescribed first direction D1. Also, the formation sheet 10, as illustrated in FIG. 6, is conveyed along the conveyance path R by the conveyer 120 in the state in which the tension F is applied by the tension unit 130 to cause warping in accordance with the conveyance path R, and thus passes through the region S of irradiation with the electromagnetic waves. Due to such configuration, the electromagnetic waves from the irradiation unit 140 irradiate the formation sheet 10 that is being conveyed in the state in which the tension F is applied to cause warping in accordance with the conveyance path R. The shaped object 50 is then manufactured.

In the present embodiment, bowing, flexing, or the like of the formation sheet 10 are suppressed by the tension F applied in accordance with the conveyance path R. Furthermore, the conveyer 120 conveys the formation sheet 10, from the second direction D2 forming the obtuse angle θ formed with the direction (+Z direction) opposite to the prescribed first direction D1 (−Z direction) of irradiation using the electromagnetic waves, and toward the region S where the irradiation unit 140 irradiates with the electromagnetic waves. Then the conveyer 120 conveys the formation sheet 10, from the region S of irradiation with the electromagnetic waves by the irradiation unit 140, and toward the third direction D3 forming the acute angle φ with the prescribed first direction D1 (−Z direction) of irradiation with the electromagnetic waves. Therefore, the irradiation unit 140 can irradiate the formation sheet 10 with the electromagnetic waves for causing expansion, while suppressing bowing, flexing, or the like of the formation sheet 10. Due to such configuration, the forming apparatus 100 can stably manufacture the shaped object 50 that has high definition unevennesses 52.

Figure 9:
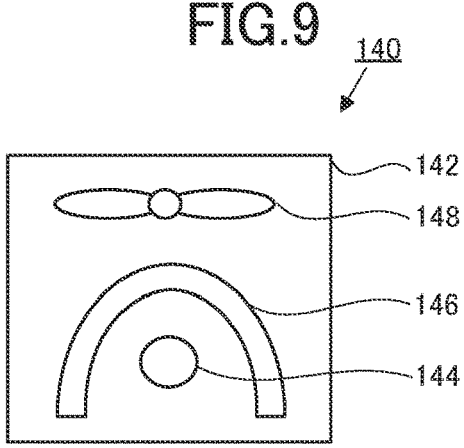
FIG. 9 is a schematic drawing illustrating the irradiation unit according to the embodiment.

As illustrated in FIG. 9, the irradiation unit 140 is equipped with a cover 142, a lamp 144, a reflector plate 146, and a fan 148. The cover 142 accommodates the lamp 144, the reflector plate 146, and the fan 148. The lamp 144 includes, for example, a straight-tube-type halogen lamp. The lamp 144 irradiates the formation sheet 10, that is, the thermal conversion layer 40, with the prescribed electromagnetic waves in the near-infrared region (wavelength of 750 to 1,400 nm), in the visible light region (wavelength of 380 to 750 nm), in the mid-infrared region (wavelength of 1,400 to 4,000 nm), or the like. The electromagnetic waves from the lamp 144 are reflected by the reflector plate 146 toward the formation sheet 10. The fan 148 blows air into the cover 142 and cools the lamp 144 and the reflector plate 146.

The control unit 150 of the forming apparatus 100 controls the conveyer 120 of the conveyance unit 110 and the irradiation unit 140. As illustrated in FIG. 4, the control unit 150 is equipped with a central processing unit (CPU) 152 that executes various types of control, a read-only memory (ROM) 154 that stores programs and data, a random-access memory (RAM) 156 that stores data, and an input-output interface 158 for input and output of signals between various components. Functions of the control unit 150 are achieved by the CPU 152 executing programs stored in the ROM 154. The input-output interface 158 performs input and output of signals between the CPU 152, the conveyer 120, and the irradiation unit 140.

Shaped Object Manufacturing Method

The manufacturing method of the shaped object 50 is described with reference to FIGS. 10 and 11. In the present embodiment, the forming apparatus 100 is used to manufacture the shaped object 50 from the sheet-like, for example, A4 paper size, formation sheet 10.

Figure 10:
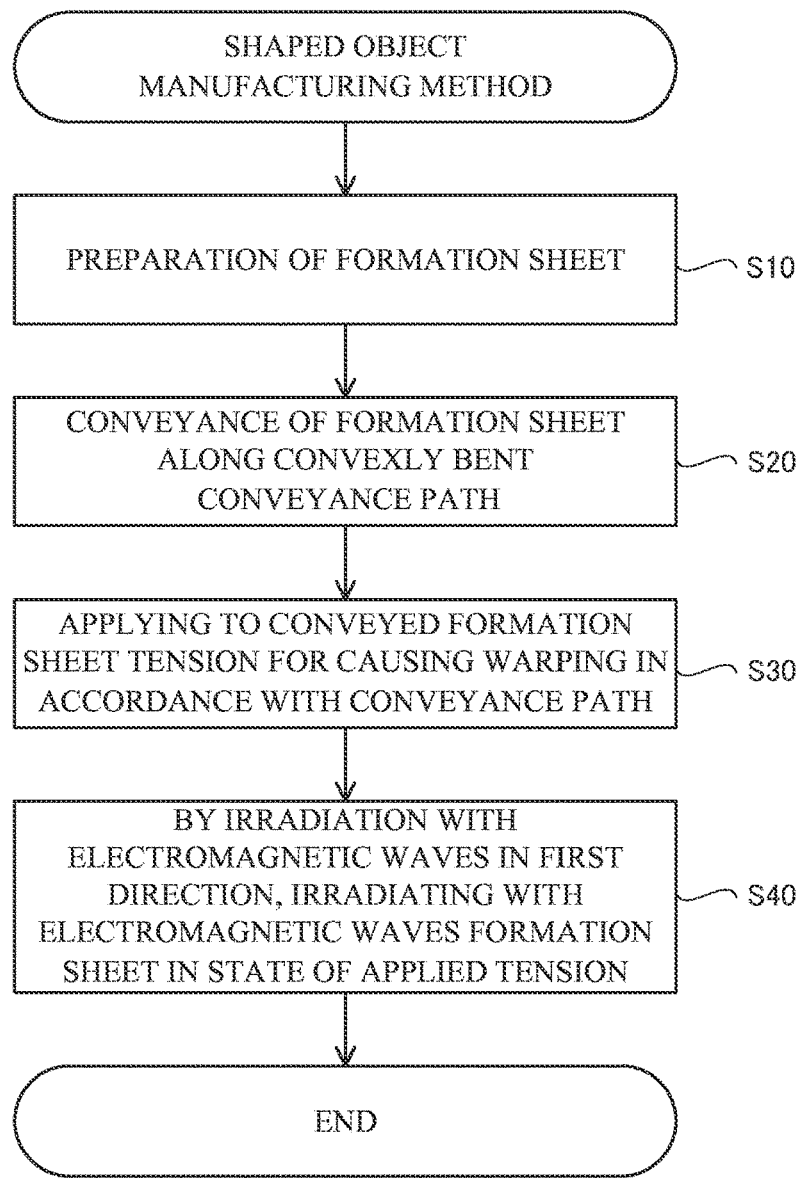
FIG. 10 is a flowchart illustrating a shaped object manufacturing method according to the embodiment.
Figure 11:
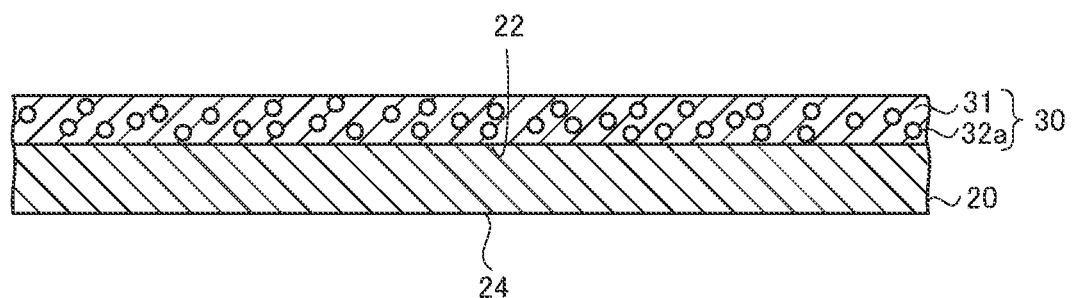
FIG. 11 is a schematic drawing illustrating a base and a thermally expansive layer of the formation sheet according to the embodiment.

FIG. 10 is a flowchart illustrating the manufacturing method of the shaped object 50. The manufacturing method of the shaped object 50 includes: a preparing step of preparing the formation sheet 10 that expands due to irradiation with the electromagnetic waves (step S10); a conveyance step of conveying the formation sheet 10 along the convexly bent conveyance path R (step S20); an application step of applying to the formation sheet 10 the tension F for causing warping in accordance with the conveyance path R (step S30); and an irradiation step of irradiating, with the electromagnetic waves for causing expansion of the formation sheet 10, the formation sheet 10 in a state of application of the tension F, by irradiation with the electromagnetic waves for causing expansion of the formation sheet 10 in a prescribed first direction D1 (step S40).

The formation sheet 10 is prepared in the preparing step (step S10). Firstly, a coating solution that is a mixture of the binder 31 and the thermally expandable material 32$a$ is applied by screen printing to the first main surface 22 of the base 20. Then the thermally expansive layer 30 is stacked on the first main surface 22 of the base 20, as illustrated in FIG. 11, by drying the printed coating solution. Next, a printer prints, on the second main surface 24 of the base 20, a contrast pattern corresponding to the unevennesses 52, using an ink that includes the thermal conversion material. The printer is an inkjet printer, for example. The formation sheet 10 can be manufactured by the above procedure.

With reference again to FIG. 10, in the conveyance step (step S20), the formation sheet 10 is inserted via the feed port 105$a$ of the forming apparatus 100 and is conveyed by the conveyer 120 along the convexly bent conveyance path R. From the standpoint of highly efficient heating of the thermally expansive layer 30, the distance between the thermal conversion layer 40 and the irradiation unit 140 is preferably short, and the formation sheet 10 is preferably conveyed in a state with the thermal conversion layer 40 facing the irradiation unit 140 side. That is to say, the formation sheet 10 is preferably conveyed by the conveyer 120 in a state in which the thermally expansive layer 30 faces the conveyance surface 126$a$ of the conveyance belt 126.

Specifically, in the conveyance step (step S20), the formation sheet 10 is conveyed, from the second direction D2 forming the obtuse angle θ with the direction opposite to the prescribed first direction D1, and toward the region S of irradiation with electromagnetic waves. Then the formation sheet 10 is conveyed, in the third direction D3 forming the acute angle φ with the prescribed first direction D1, and from the region S of irradiation with the electromagnetic waves, thereby passing through the region S of irradiation with the electromagnetic waves. Due to such processing, at the conveyance-direction peripheral portion of the region S of irradiation with the electromagnetic waves, the distance L2 between the irradiation unit 140 and the formation sheet 10 lengthens, thereby lowering the heating temperature of the unexpanded thermally expandable material 32$a$. Therefore, the manufacturing method of the shaped object 50 of the present embodiment can suppress unintentional occurrence of heating at the conveyance-direction peripheral portion of the region S of irradiation with the electromagnetic waves, thereby enabling suppression of the occurrence of rounding at the edge portions of the protrusions 54. The manufacturing method of the shaped object 50 of the present embodiment can suppress the occurrence of rounding at the edge portions of the protrusions 54 of the shaped object 50, thereby enabling manufacture of the shaped object 50 that has high definition unevennesses 52.

In the application step (step S30), the formation sheet 10 conveyed by the conveyer 120 is pressed against the conveyance belt 126 of the conveyer 120 by the pressing belts 131 and 132 of the tension unit 130, thereby applying the tension F for warping the formation sheet 10 in accordance with the conveyance path R. In the present embodiment, the application to the formation sheet 10 of the tension F that causes warping in accordance with the conveyance path R enables suppression of bowing, flexing, or the like of the formation sheet 10.

In the irradiation step (step S40), the electromagnetic waves for causing expansion of the formation sheet 10 are emitted from the irradiation unit 140 toward the prescribed first direction. Due to such operation, the formation sheet 10, in a state of conveyance by the conveyer 120 and with the tension F applied by the pressing belts 131 and 132 of the tension unit 130 to cause warping in accordance with the conveyance path R, is irradiated with the electromagnetic waves for causing expansion of the formation sheet 10. Then the unevennesses 52 are formed by expansion of the thermally expansive layer 30 of the formation sheet 10, and the shaped object 50 is manufactured. Suppression of bowing, flexing, or the like enables stable manufacture of the shaped object 50 from the formation sheet 10 in the state in which the tension F for causing warping in accordance with the conveyance path R. The shaped object 50 manufactured as above is discharged by the conveyer 120 from the output port 105*b* of the forming apparatus 100.

In the aforementioned manner, in the forming apparatus 100, the tension unit 130 applies the tension F to the formation sheet 10 for causing warping in accordance with the convexly bent conveyance path R. The conveyer 120 conveys the formation sheet 10, from the second direction D2 forming the obtuse angle θ with the direction opposite to the prescribed first direction D1 of irradiation with the electromagnetic waves, and toward the region S of irradiation with the electromagnetic waves. Moreover, the conveyer 120 conveys the formation sheet 10, from the region S of irradiation with the electromagnetic waves, and toward the third direction D3 forming the acute angle φ with the prescribed first direction D1 of irradiation with the electromagnetic waves. Due to irradiation in the prescribed first direction D1 with the electromagnetic waves for causing expansion of the formation sheet 10, the irradiation unit 140 irradiates, with the electromagnetic waves for causing expansion of the formation sheet 10, the formation sheet 10 in the state in which the tension F is applied for causing warping in accordance with the conveyance path R. Due to the application of the tension F to the formation sheet 10 for causing warping in accordance to the conveyance path R, the forming apparatus 100 can suppress bowing, flexing, or the like of the formation sheet 10, and can suppress the occurrence of unintended heating at the peripheral portion of the region S of irradiation with the electromagnetic waves. Therefore, the forming apparatus 100 can manufacture the shaped object 50 that has the high definition unevennesses 52.

In the manufacturing method of the shaped object 50 of the present embodiment, the conveyer 120 conveys the formation sheet 10 in the state in which the tension F is applied for causing warping in accordance with the conveyance path R. The conveyer 120 conveys the formation sheet 10 with the tension F applied thereto, toward the region S of irradiation with the electromagnetic waves, and from the second direction D2 forming the obtuse angle θ with the direction opposite to the prescribed first direction D1 of irradiation with the electromagnetic waves. Moreover, the conveyer 120 conveys the formation sheet 10 to which the tension F is applied, from the region S of irradiation with the electromagnetic waves, and toward the third direction D3 forming the acute angle φ with the prescribed first direction D1 of irradiation with the electromagnetic waves. Due to the irradiation unit 140 irradiating in the prescribed first direction D1 with the electromagnetic waves for causing expansion of the formation sheet 10, the formation sheet 10 under applied the tension F is irradiated with the electromagnetic waves for causing expansion of the formation sheet 10. Due to the suppression of bowing, flexing, or the like of the formation sheet 10 by the tension F for causing warping in accordance with the conveyance path R, and due to the suppression of the occurrence of unintended heating of the formation sheet 10 at the peripheral portion of the region S of irradiation with the electromagnetic waves, the manufacturing method of the shaped object 50 of the present embodiment can stably manufacture the shaped object 50 that has the high definition unevennesses 52.

MODIFIED EXAMPLE

Although an embodiment of the present disclosure is described above, various types of modifications of the present disclosure are possible within a scope that does not depart from the gist of the present disclosure.

For example, a roll-like shaped object 50 may be manufactured from a roll-like formation sheet 10.

The material included in the base 20 is not limited to thermoplastic resins. The material included in the base 20 may be paper, cloth, or the like. The thermoplastic resin included in the base 20 is not limited to polyolefin type resins and polyester type resins. The thermoplastic resin included in the base 20 may be a polyamide type resin, a polyvinyl chloride (PVC) type resin, a polyimide type resin, or the like.

Figure 12:
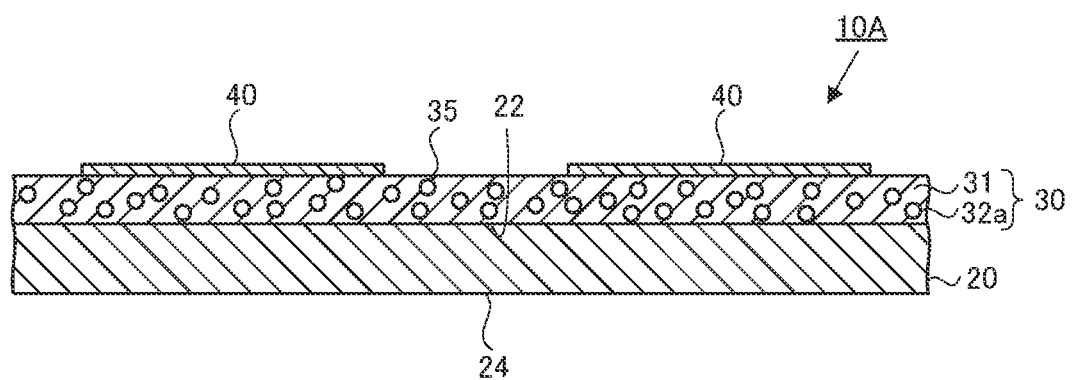
FIG. 12 is a schematic drawing illustrating a cross section of a formation sheet according to a modified example.
Figure 13:
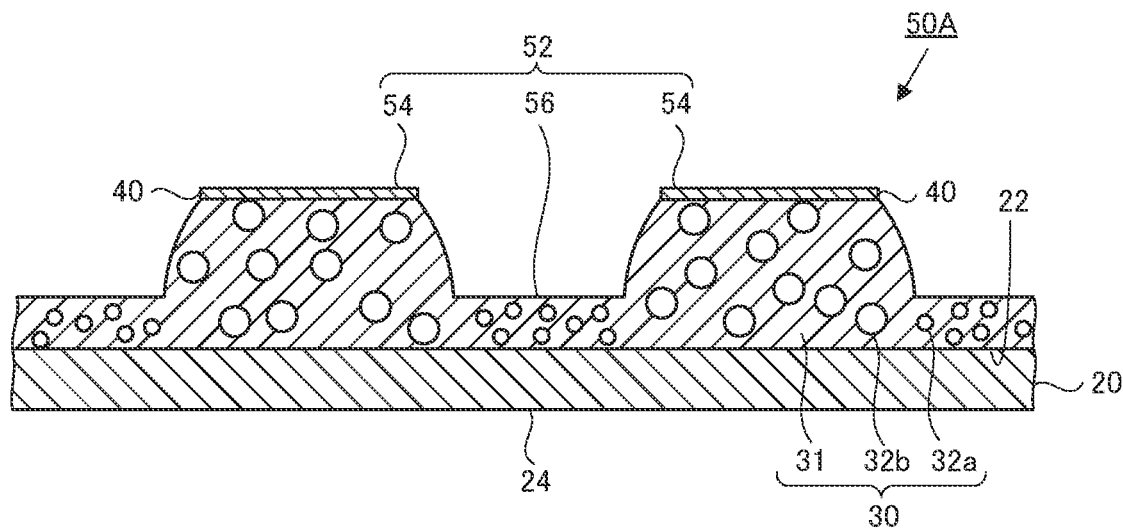
FIG. 13 is a schematic drawing illustrating a cross section of a shaped object according to the modified example.

Although the thermal conversion layer 40 of the embodiment is stacked on the second main surface 24 of the base 20, the thermal conversion layer 40 may be stated on the thermally expansive layer 30 as illustrated in FIG. 12. The forming apparatus 100 manufactures, from a formation sheet 10A having the thermal conversion layer 40 stacked on the thermally expansive layer 30, a shaped object 50A having the thermal conversion layer 40 stacked on the thermally expansive layer 30 as illustrated in FIG. 13. In this case, the formation sheet 10A is preferably conveyed by the conveyer 120 (conveyance unit 110) in a state in which the thermal conversion layer 40 faces the irradiation unit 140 side. That is, the formation sheet 10A is preferably conveyed, by the conveyer 120 (conveyance unit 110), in the state in which the second main surface 24 of the base 20 faces the conveyance surface 126*a* of the conveyance belt 126.

Figure 14:
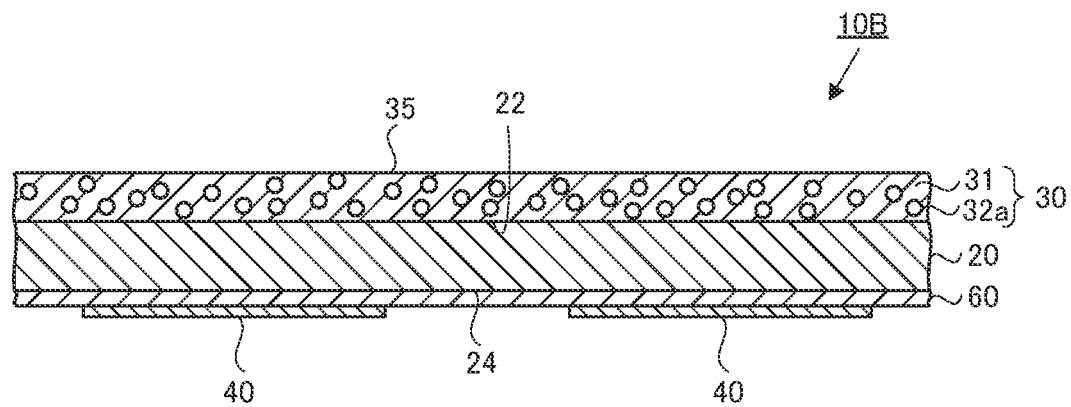
FIG. 14 is a schematic drawing illustrating a cross section of the formation sheet according to the modified example.
Figure 15:
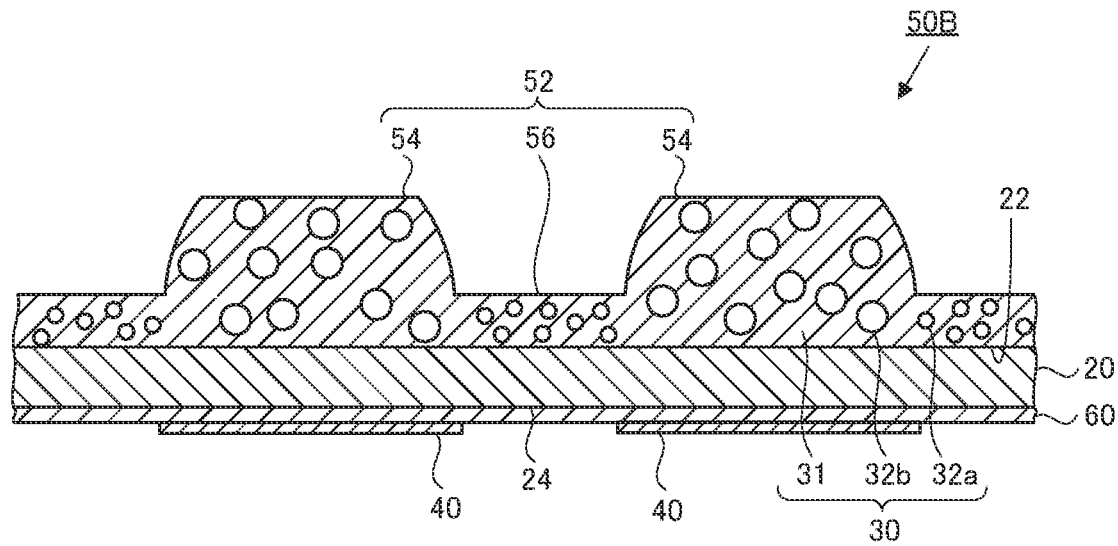
FIG. 15 is a schematic drawing illustrating a cross section of the shaped object according to the modified example.

Moreover, the thermal conversion layer 40 may be stacked on a release layer 60 arranged on the second main surface 24 of the base 20. For example, a formation sheet 10B may be equipped as illustrated in FIG. 14 with (i) a release layer 60 arranged on the second main surface 24 of the base 20, and (ii) the thermal conversion layer 40 stacked on the release layer 60. A shaped object 50B illustrated in FIG. 15 is manufactured from the formation sheet 10B by use of the forming apparatus 100. The shaped object 50B is equipped with (i) the release layer 60 arranged on the second main surface 24 of the base 20, and (ii) the thermal conversion layer 40 stacked on the release layer 60. In this case, the formation sheet 10B is preferably conveyed by the conveyer 120 in a state in which the thermal conversion layer 40 faces the irradiation unit 110 side. That is to say, the formation sheet 10B is preferably conveyed by the conveyer 120 in the state in which the thermally expansive layer 30 faces the conveyance surface 126a of the conveyance belt 126. Furthermore, the thermal conversion layer 40 can be easily removed from the shaped object 50B by release of the release layer 60 from the shaped object 50B.

Figure 16:
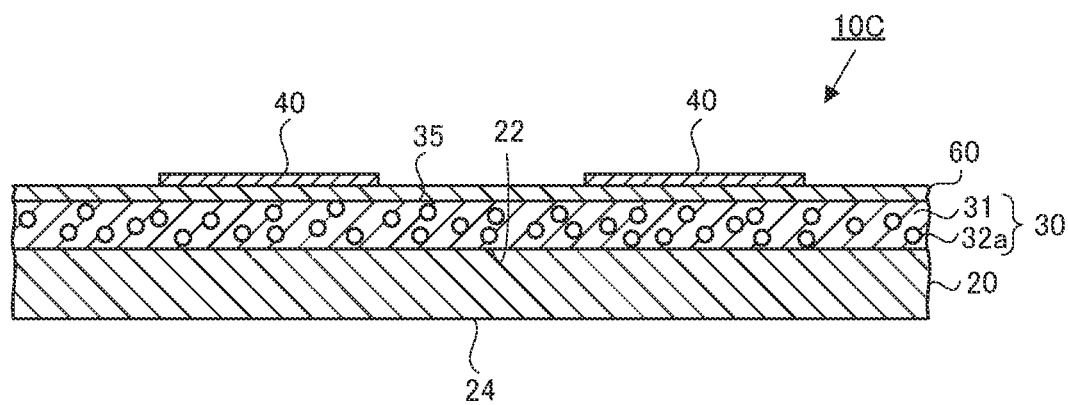
FIG. 16 is a schematic drawing illustrating a cross section of the formation sheet according to the modified example.
Figure 17:
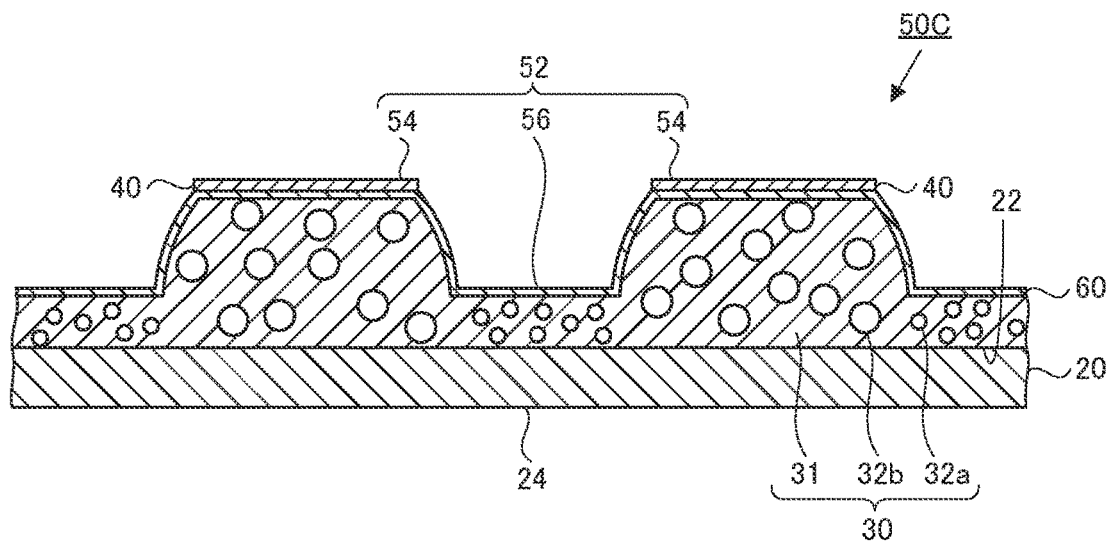
FIG. 17 is a schematic drawing illustrating the cross section of the shaped object according to the modified example.

Furthermore, the thermal conversion layer 40 may be stacked on the release layer 60 arranged on the thermally expansive layer 30. For example, as illustrated in FIG. 16, a formation sheet 10C may be equipped with (i) the release layer 60 arranged on the thermally expansive layer 30, and (ii) the thermal conversion layer 40 stacked on the release layer 60. A shaped object 50C illustrated in FIG. 17 is manufactured from the formation sheet 10C by use of the forming apparatus 100. The shaped object 50C is equipped with (i) the release layer 60 arranged on the thermally expansive layer 30 and (ii) the thermal conversion layer 40 stacked on the release layer 60. In this case, the formation sheet 10C is preferably conveyed by the conveyer 120 in a state in which the thermal conversion layer 40 faces the irradiation unit 110 side. That is to say, the formation sheet 10C is preferably conveyed by the conveyer 120 in the state in which the second main surface 24 of the base 20 faces the conveyance surface 126a of the conveyance belt 126. The thermal conversion layer 40 can be easily removed from the shaped object 50C by releasing the release layer 60 from the shaped object 50C. Such configuration enables avoidance of color dullness caused by the thermal conversion layer 40.

The formation sheets 10 and 10A-10C, and the shaped objects 50 and 50A-50C manufactured from the formation sheets 10 and 10A-10C, may have layers of other freely-selected materials between the various layers. For example, a closely conforming layer for causing closer conformance between the base 20 and the thermally expansive layer 30 may be formed between the base 20 and the thermally expansive layer 30. The closely conforming layer, for example, includes a surface modifier.

Moreover, a color image may be printed on the shaped objects 50, 50A, 50B, and 50C. For example, a color ink layer, including 4 color inks of cyan, magenta, yellow, and black and displaying a color image, may be stacked on the thermally expansive layer 30 of the shaped object 50.

The forming apparatus 100 of the embodiment conveys the formation sheet 10 in the region S of irradiation with the electromagnetic waves. Therefore, the forming apparatus 100 of the embodiment may be represented as a conveyance apparatus equipped with (i) an irradiation unit 140 for irradiation with the electromagnetic waves, and (ii) a conveyance unit 110 for conveying the formation sheet 10, that expands due to irradiation with the electromagnetic waves in the region S of irradiation with the electromagnetic waves, along the convexly bent conveyance path R in the state in which the tension F is applied to cause warping in accordance with the convexly bent conveyance path R.

In the embodiment, the bottom edge B1 of the outer periphery 133c of the first pulley 133a and the bottom edge B2 of the outer periphery 133d of the second pulley 133b are located at positions (−Z side) lower than the apex T2 of the conveyance belt 126. The bottom edge B1 of the outer periphery 133c of the first pulley 133a and the bottom edge B2 of the outer periphery 133d of the second pulley 133b may be located at the same height, that is, at the same position in the +Z direction, as that of the apex T2 of the conveyance belt 126. Due to such configuration, the pressing belt 131 can compress, by an amount that is the sum of a thickness of the formation sheet 10 and a thickness of the pressing belt 131, against the conveyance belt 126 the +Y side edge portion of the formation sheet 10. Moreover, a bottom edge of the outer periphery of the third pulley 134a upon which is wound the pressing belt 132 and a bottom edge of the outer periphery of the fourth pulley 134b upon which is wound the pressing belt 132 may be located at the same height as that of the apex T2 of the conveyance belt 126. Due to such configuration, the pressing belt 132 can compress, by an amount that is the sum of the thickness of the formation sheet 10 and the thickness of the pressing belt 132, against the conveyance belt 126 the −Y side edge portion of the formation sheet 10.

Figure 18:
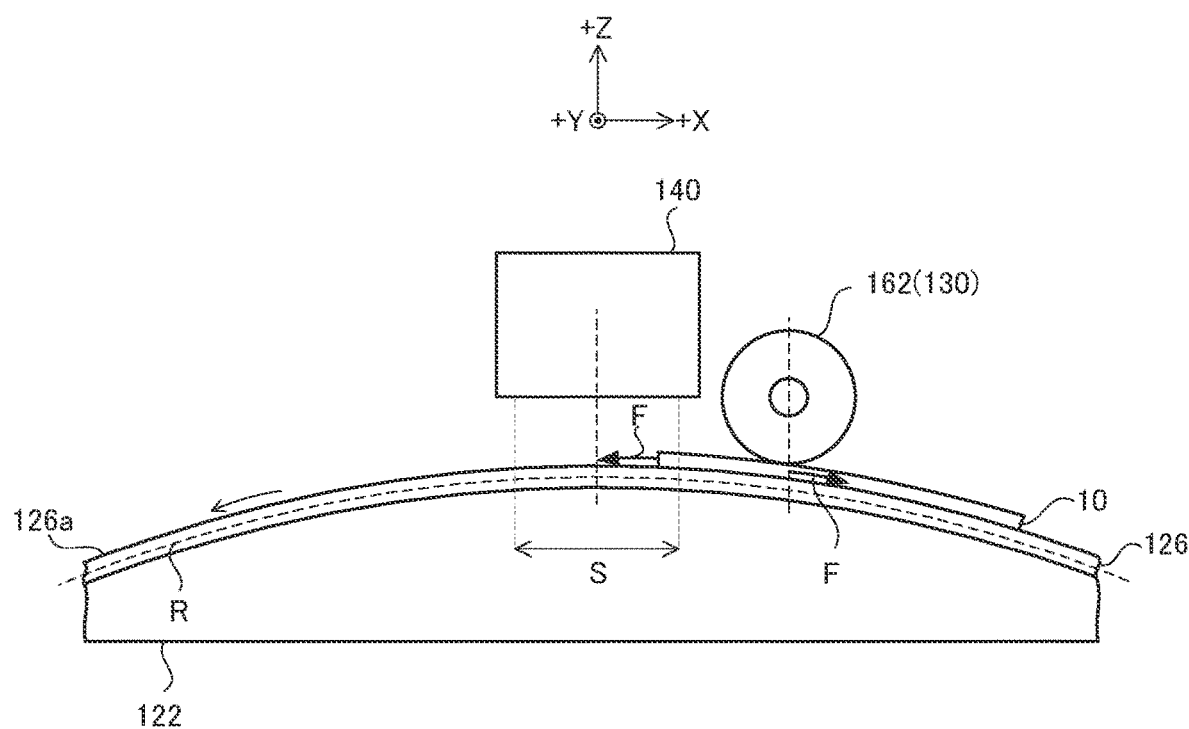
FIG. 18 is a schematic drawing for description of a tension unit and tension applied to the formation sheet, according to the modified example.

Although the tension unit 130 of the embodiment applies the tension F along the conveyance path R to the formation sheet 10 by the pair of pressing belts 131 and 132, the configuration of the tension unit 130 is not limited to a configuration that has the pair of pressing belts 131 and 132. For example, as illustrated in FIG. 18, the tension unit 130 may be provided with a roller 162 that, together with the conveyance belt 126, sandwiches the formation sheet 10 at the upstream side (+X side) of the conveyance path R relative to the irradiation unit 140. The roller 162 and the conveyance belt 126 sandwich the formation sheet 10 during conveyance, and the roller 162 applies a load against the conveyance of the formation sheet 10. Due to such configuration, the tension F can be applied to the formation sheet 10 that causes warping in accordance with the conveyance path R.

Figure 19:
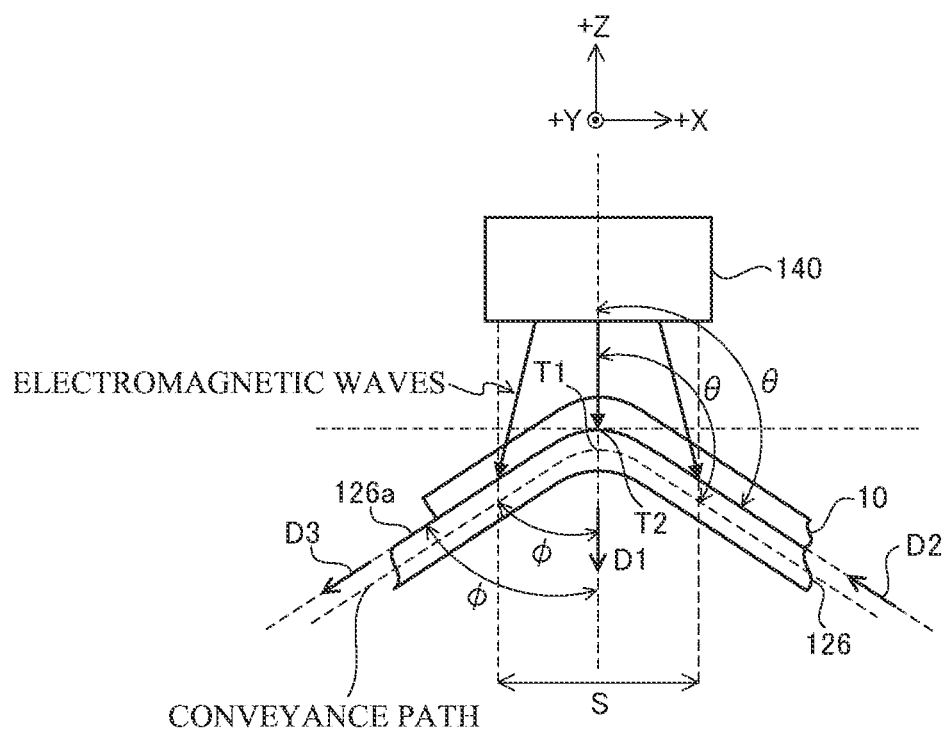
FIG. 19 is a schematic drawing illustrating a region of irradiation with the electromagnetic waves and the conveyed formation sheet, according to the modified example.

The conveyer 120 of the forming apparatus 100, as illustrated in FIG. 19, may convey the formation sheet 10 along the conveyance path, tilted toward the direction forming the acute angle φ with the prescribed first direction D1 at the downstream side of the region S of irradiation with the electromagnetic waves, and tilted toward the direction forming the obtuse angle θ with the direction opposite to the prescribed first direction D1 at the upstream side of the region S of irradiation by the electromagnetic waves.

Per the forming apparatus 100 of the embodiment, the irradiation unit 140 irradiates with the prescribed electromagnetic waves in the −Z direction, that is, in the vertical direction, and the conveyer 120 is arranged below the irradiation unit 140. Moreover, the conveyer 120 conveys the formation sheet 10, toward the third direction D3 forming the acute angle φ with the prescribed first direction D1 from the region S of irradiation with the prescribed electromagnetic waves, and from the second direction D2 forming the obtuse angle θ with the direction opposite to the prescribed first direction D1 to the region S of irradiation with the prescribed electromagnetic waves. Therefore, the forming apparatus 100 of the embodiment is equipped with (i) the irradiation unit 140 for irradiation with the prescribed electromagnetic waves in the vertical direction, and (ii) the conveyer 120 arranged below the irradiation unit 140, for causing the formation sheet 10 to expand due to irradiation with the prescribed electromagnetic waves, and for causing passage through the region S for irradiation with the prescribed electromagnetic waves; and the conveyer 120, after feeding of the formation sheet 10 into the region S of irradiation with the prescribed electromagnetic waves by upwardly tilted conveyance of the formation sheet 10, conveys the formation sheet 10 outside the region S of irradiation with the prescribed electromagnetic waves by downwardly tilted conveyance of the formation sheet 10.

The control unit 150 of the forming apparatus 100 is equipped with the CPU 152 and executes various processing by use of functions of the CPU 152. In the forming apparatus according to the present disclosure, the control unit may be equipped with, instead of the CPU, dedicated hardware such as an application specific integrated circuit (ASIC), a field-programmable gate array (FPGA), a control circuit, or the like. In this case, each process may be executed respectively by separate hardware. Alternatively, processing may be executed collectively by a single unit of hardware. A portion of the processing may be executed using dedicated hardware, and the other portion of the processing may be executed by software or firmware.

Furthermore, by the ability to provide an existing forming apparatus with the configuration for achievement of the functions according to the present disclosure, each functional configuration of the forming apparatus 100 of the embodiment can be achieved by a computer controlling the forming apparatus by using a dedicated program. That is, the program for achieving each functional configuration of the forming apparatus 100 of the embodiment can be used to enable execution by a CPU or the like that controls an existing information processing apparatus or the like.

Moreover, the method of application of such a program is freely selected. The program can be used by storage on a computer-readable recording medium such as a flexible disc, a compact disc-ROM (CD), a digital versatile disc-ROM (DVD), a memory card, or the like. Furthermore, the program may be superimposed on a carrier wave and used through a communication medium such as the Internet. For example, distribution of the program may be performed by posting to a bulletin board system (BBS) on a communication network. A configuration may be used that enables execution of the aforementioned processing by execution under control of an operating system (OS) similarly to other application programs.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. A forming apparatus comprising:
   a conveyance unit configured to convey, along a conveyance path that is convexly bent, a formation sheet that expands due to irradiation with electromagnetic waves, the conveyance unit being configured to convey the formation sheet in a state in which tension is applied to the formation sheet so as to warp the formation sheet in accordance with a shape of the conveyance path that is convexly bent; and
   an irradiation unit configured to irradiate with the electromagnetic waves the formation sheet during conveyance by the conveyance unit of the formation sheet in the state in which the tension is applied,
   wherein:
   the conveyance unit comprises (i) a pair of pulleys positioned above the conveyance path and opposing the conveyance path, and (ii) a belt wound on the pair of pulleys, and
   the tension is applied to the formation sheet by the belt pressing the formation sheet.

2. The forming apparatus according to claim 1, wherein after feeding the formation sheet into a region of irradiation with the electromagnetic waves by conveying the formation sheet in an upwardly tilted direction, the conveyance unit discharges the formation sheet to an exterior of the region of irradiation with the electromagnetic waves by conveying the formation sheet in a downwardly tilted direction.

3. The forming apparatus according to claim 1, wherein the conveyance unit conveys the formation sheet from a direction forming an obtuse angle with a direction opposite to a first direction and toward a region of irradiation with the electromagnetic waves, and conveys the formation sheet from the region of irradiation with the electromagnetic waves toward a direction forming an acute angle with the first direction.

4. The forming apparatus according to claim 1, wherein the conveyance unit further comprises a conveyer configured to convey the formation sheet along the conveyance path.

5. The forming apparatus according to claim 1, wherein the irradiation unit is disposed at a convex side of the conveyance path.

6. The forming apparatus according to claim 1, wherein the formation sheet comprises:
   a base;
   a thermally expansive layer that is stacked on a first main surface of the base and that is configured to expand due to heating, and
   a thermal conversion layer that is stacked on one of (i) a second main surface of the base and (ii) the thermally expansive layer, and that is configured to heat the thermally expansive layer by absorbing the electromagnetic waves to convert the absorbed electromagnetic waves into heat.

7. A conveyance apparatus comprising:
   an irradiation unit configured to irradiate electromagnetic waves; and
   a conveyance unit configured to convey, in a region of irradiation irradiated with the electromagnetic waves, along a conveyance path that is convexly bent, a formation sheet that expands due to irradiation with the electromagnetic waves, the conveyance unit being configured to convey the formation sheet in a state in which tension is applied to the formation sheet so as to warp the formation sheet in accordance with a shape of the conveyance path that is convexly bent,
   wherein:
   the conveyance unit comprises (i) a pair of pulleys positioned above the conveyance path and opposing the conveyance path, and (ii) a belt wound on the pair of pulleys, and
   the tension is applied to the formation sheet by the belt pressing the formation sheet.

8. The forming apparatus according to claim 4, wherein the conveyer comprises (i) a conveyance belt configured to carry the formation sheet such that the formation sheet travels along the conveyance path, and (ii) a guide unit configured to support the conveyance belt in a state such that the conveyance belt bends in accordance with the shape of the conveyance path.

9. The forming apparatus according to claim 5, wherein the irradiation unit is disposed at a position of irradiation with the electromagnetic waves toward an upper side of an apex of the conveyance path.

10. The forming apparatus according to claim 6, wherein the conveyance unit conveys the formation sheet in a state in which the thermal conversion layer faces the irradiation unit.

11. The conveyance apparatus according to claim 7, wherein the conveyance unit, after feeding of the formation sheet into the region of irradiation with the electromagnetic waves by conveyance of the formation sheet in an upwardly tilted direction, discharges the formation sheet to an exterior of the region of irradiation with the electromagnetic waves by conveying the formation sheet in a downwardly tilted direction.

12. The conveyance apparatus according to claim 7, wherein the conveyance unit causes the formation sheet to pass through the region of irradiation with the electromagnetic waves by:
- conveying the formation sheet (i) from a direction forming an obtuse angle with a direction opposite to a first direction and (ii) toward the region of irradiation with the electromagnetic waves, and
- conveying the formation sheet (i) in a direction forming an acute angle with the first direction and (ii) from the region of irradiation with the electromagnetic waves.

* * * * *